United States Patent
Goyal

(10) Patent No.: US 12,032,550 B2
(45) Date of Patent: *Jul. 9, 2024

(54) MULTI-TENANT PARTITIONING IN A TIME-SERIES DATABASE

(71) Applicant: Amazon Technologies, Inc., Seattle, WA (US)

(72) Inventor: Dumanshu Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,883

(22) Filed: Aug. 5, 2022

(65) Prior Publication Data
US 2022/0374407 A1    Nov. 24, 2022

Related U.S. Application Data

(63) Continuation of application No. 16/267,330, filed on Feb. 4, 2019, now Pat. No. 11,409,725.

(51) Int. Cl.
*G06F 16/22* (2019.01)
*G06F 16/2458* (2019.01)
*G06F 16/27* (2019.01)
*G06F 18/231* (2023.01)

(52) U.S. Cl.
CPC ...... *G06F 16/2282* (2019.01); *G06F 16/2255* (2019.01); *G06F 16/2477* (2019.01); *G06F 16/278* (2019.01); *G06F 18/231* (2023.01)

(58) Field of Classification Search
CPC ............. G06F 16/2282; G06F 16/2255; G06F 16/2477; G06F 16/278; G06F 18/231

USPC ........................................................ 707/746
See application file for complete search history.

(56) References Cited

U.S. PATENT DOCUMENTS

| | | |
|---|---|---|
| 5,765,171 A | 6/1998 | Gehani et al. |
| 6,256,634 B1 | 7/2001 | Moshaiov et al. |
| 7,519,734 B1 | 4/2009 | Dumitriu |
| 7,779,025 B2 | 8/2010 | Gunawardena et al. |
| 8,132,046 B2 | 3/2012 | Varghese |

(Continued)

FOREIGN PATENT DOCUMENTS

WO    2015070232    5/2015

OTHER PUBLICATIONS

U.S. Appl. No. 17/349,790, dated Jun. 16, 2021, Sudipto Das.

(Continued)

*Primary Examiner* — Michael Pham
(74) *Attorney, Agent, or Firm* — Robert C. Kowert; Kowert, Hood, Munyon, Rankin & Goetzel, P.C.

(57) ABSTRACT

Methods, systems, and computer-readable media for multi-tenant partitioning in a time-series database are disclosed. A partitioning scheme is determined that maps a plurality of data points to a plurality of partitions based at least in part on table identifiers associated with the data points. The partitions are stored using a plurality of storage resources. After the storage resources are provisioned, an additional table identifier is generated. Based at least in part on the partitioning scheme, one or more additional data points comprising the additional table identifier are mapped to a particular partition of the plurality of partitions. The one or more additional data points are stored in the particular partition using the storage resources.

20 Claims, 7 Drawing Sheets

(56) References Cited

U.S. PATENT DOCUMENTS

| | | |
|---|---|---|
| 8,219,581 B2 | 7/2012 | Roy |
| 8,276,154 B2 | 9/2012 | Toub et al. |
| 8,335,765 B2 | 12/2012 | Sivasubramanian et al. |
| 8,386,540 B1 | 2/2013 | McAlister et al. |
| 8,595,547 B1 | 11/2013 | Sivasubramanian et al. |
| 8,601,112 B1 | 12/2013 | Nordstrom et al. |
| 8,676,851 B1 | 3/2014 | Nesbit |
| 8,930,312 B1 | 1/2015 | Rath |
| 8,965,849 B1 | 2/2015 | Goo |
| 9,069,827 B1 | 6/2015 | Rath |
| 9,128,965 B1 | 9/2015 | Yanacek |
| 9,286,001 B2 | 3/2016 | Skjolsvold et al. |
| 9,449,122 B2 | 9/2016 | Haas et al. |
| 9,514,199 B1 | 12/2016 | Deprey et al. |
| 9,607,019 B1 | 3/2017 | Swift et al. |
| 9,607,067 B2 | 3/2017 | Haas et al. |
| 9,626,374 B2 | 4/2017 | Hirsch et al. |
| 9,672,257 B2 | 6/2017 | Tobin et al. |
| 9,773,015 B2 | 9/2017 | Guo et al. |
| 9,817,727 B2 | 11/2017 | McAlister et al. |
| 9,836,492 B1 | 12/2017 | Hermanson |
| 9,934,107 B1 | 4/2018 | Chikkanayakanahally et al. |
| 10,007,513 B2 | 6/2018 | Malladi et al. |
| 10,459,827 B1 | 10/2019 | Aghdaie |
| 10,776,355 B1 | 9/2020 | Batsakis |
| 10,997,137 B1 | 5/2021 | Goyal et al. |
| 11,068,537 B1 | 7/2021 | Goyal et al. |
| 11,216,487 B1 | 1/2022 | Goyal et al. |
| 11,250,019 B1 | 2/2022 | Goyal et al. |
| 11,256,719 B1 | 2/2022 | Saxena et al. |
| 11,258,683 B2 | 2/2022 | Park |
| 11,263,184 B1 | 3/2022 | Ozen et al. |
| 11,409,725 B1* | 8/2022 | Goyal ................. G06F 16/2255 |
| 11,513,854 B1 | 11/2022 | Saxena et al. |
| 11,537,619 B1 | 12/2022 | Goyal |
| 11,573,981 B1 | 2/2023 | Goyal et al. |
| 2004/0133590 A1 | 7/2004 | Henderson et al. |
| 2008/0052322 A1 | 2/2008 | Gusciora |
| 2010/0121817 A1 | 5/2010 | Meyer et al. |
| 2010/0153953 A1 | 6/2010 | Adl-Tabatabai |
| 2011/0282836 A1 | 11/2011 | Erickson et al. |
| 2014/0067810 A1 | 3/2014 | Wisnovsky |
| 2014/0122434 A1 | 5/2014 | Knight et al. |
| 2014/0236890 A1 | 8/2014 | Vasan |
| 2015/0134626 A1 | 5/2015 | Theimer |
| 2015/0134795 A1 | 5/2015 | Theimer et al. |
| 2015/0134796 A1 | 5/2015 | Theimer et al. |
| 2015/0135255 A1 | 5/2015 | Theimer et al. |
| 2015/0149413 A1 | 5/2015 | Lee |
| 2015/0293955 A1 | 10/2015 | Dickey |
| 2015/0324255 A1 | 11/2015 | Kochunni |
| 2016/0062837 A1 | 3/2016 | Slik |
| 2016/0248676 A1 | 8/2016 | Thanasekaran |
| 2016/0328432 A1 | 11/2016 | Raghunathan |
| 2016/0334998 A1 | 11/2016 | George et al. |
| 2016/0357828 A1 | 12/2016 | Tobin et al. |
| 2016/0371153 A1 | 12/2016 | Dornemann |
| 2016/0373929 A1 | 12/2016 | Stirling |
| 2017/0060574 A1 | 3/2017 | Malladi et al. |
| 2017/0103103 A1 | 4/2017 | Nixon et al. |
| 2017/0177546 A1 | 6/2017 | Heinz |
| 2017/0177646 A1 | 6/2017 | Chen et al. |
| 2017/0228257 A1 | 8/2017 | Dong et al. |
| 2017/0286499 A1 | 9/2017 | Sanders et al. |
| 2017/0286486 A1 | 10/2017 | Pang |
| 2018/0089328 A1 | 3/2018 | Bath |
| 2018/0332367 A1 | 5/2018 | Kaitchuck |
| 2018/0189337 A1 | 7/2018 | Milby |
| 2018/0232422 A1 | 8/2018 | Park et al. |
| 2018/0246934 A1 | 8/2018 | Arye |
| 2018/0316568 A1 | 11/2018 | Gill |
| 2018/0332087 A1 | 11/2018 | Paduroiu |
| 2018/0332366 A1 | 11/2018 | Paduroiu |
| 2019/0050453 A1 | 2/2019 | Duffield et al. |
| 2019/0065278 A1 | 2/2019 | Jeuk et al. |
| 2019/0095241 A1* | 3/2019 | Ago ................. G06F 16/24573 |
| 2019/0146849 A1 | 5/2019 | Leonard et al. |
| 2019/0171748 A1 | 6/2019 | Duffield |
| 2019/0197179 A1 | 6/2019 | Spratt |
| 2019/0236149 A1 | 8/2019 | Kuruvada |
| 2019/0250819 A1 | 8/2019 | Jain |
| 2019/0310919 A1 | 10/2019 | Natanzon et al. |
| 2020/0167360 A1 | 5/2020 | Rath |
| 2020/0167361 A1 | 5/2020 | Princehouse |
| 2022/0121684 A1 | 4/2022 | Goyal et al. |

OTHER PUBLICATIONS

U.S. Appl. No. 16/176,629, filed Oct. 31, 2018, Dumanshu Goyal.
U.S. Appl. No. 17/349,786, dated Jun. 16, 2021, Sudipto Das.
U.S. Appl. No. 16/199,078, filed Nov. 23, 2018, Timothy A. Rath et al.
U.S. Appl. No. 16/199,102, filed Nov. 23, 2018, Lonnie J. Princehouse et al.
U.S. Appl. No. 16/199,103, filed Nov. 23, 2018, Timothy A. Rath et al.
U.S. Appl. No. 17/234,372, dated Apr. 19, 2021, Evgeniy Retyunskiy.
U.S. Appl. No. 16/008,940, filed Jun. 14, 2018, Rajneesh Kumar.
U.S. Appl. No. 16/219,686, filed Dec. 13, 2018, Dumanshu Goyal.
U.S. Appl. No. 16/357,224, filed Mar. 18, 2019, Dumanshu Goyal.
Anonymous, "Amazon Kinesis Streams: Developer Guide", Dated Nov. 16, 2017, From http:/web.archive.org.web/20171116223501if_/http://docs.aws.amazon.com:80/streams/latesl/dev/kinesis-dg.pdf, pp. 1-143.
Anonymous, Amazon Kinesis Firehose: Developer Guide, dated Oct. 25, 2017, From http://web.archive.org/ web/20171025072815if_/http://docs.aws.amazon.com:80/firehose/latesl/dev/firehose-dg .pdf, p. 1-66.
Arvind Thiagarajan, et al., "Querying Continuous Functions in a Database System", Proceedings of the 2008 ACM SIGMOD international conference on Management of data (SIGMOD '08), Jun. 9, 2008, pp. 791-804, Association for Computing Machinery, New York, NY, USA.
U.S. Appl. No. 18/441,948, filed Feb. 14, 2024, Princehouse; Lonnie J.

* cited by examiner

MULTI-TENANT PARTITIONING IN A TIME-SERIES DATABASE

This application is a continuation of U.S. patent application Ser. No. 16/267,330, filed Feb. 4, 2019, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
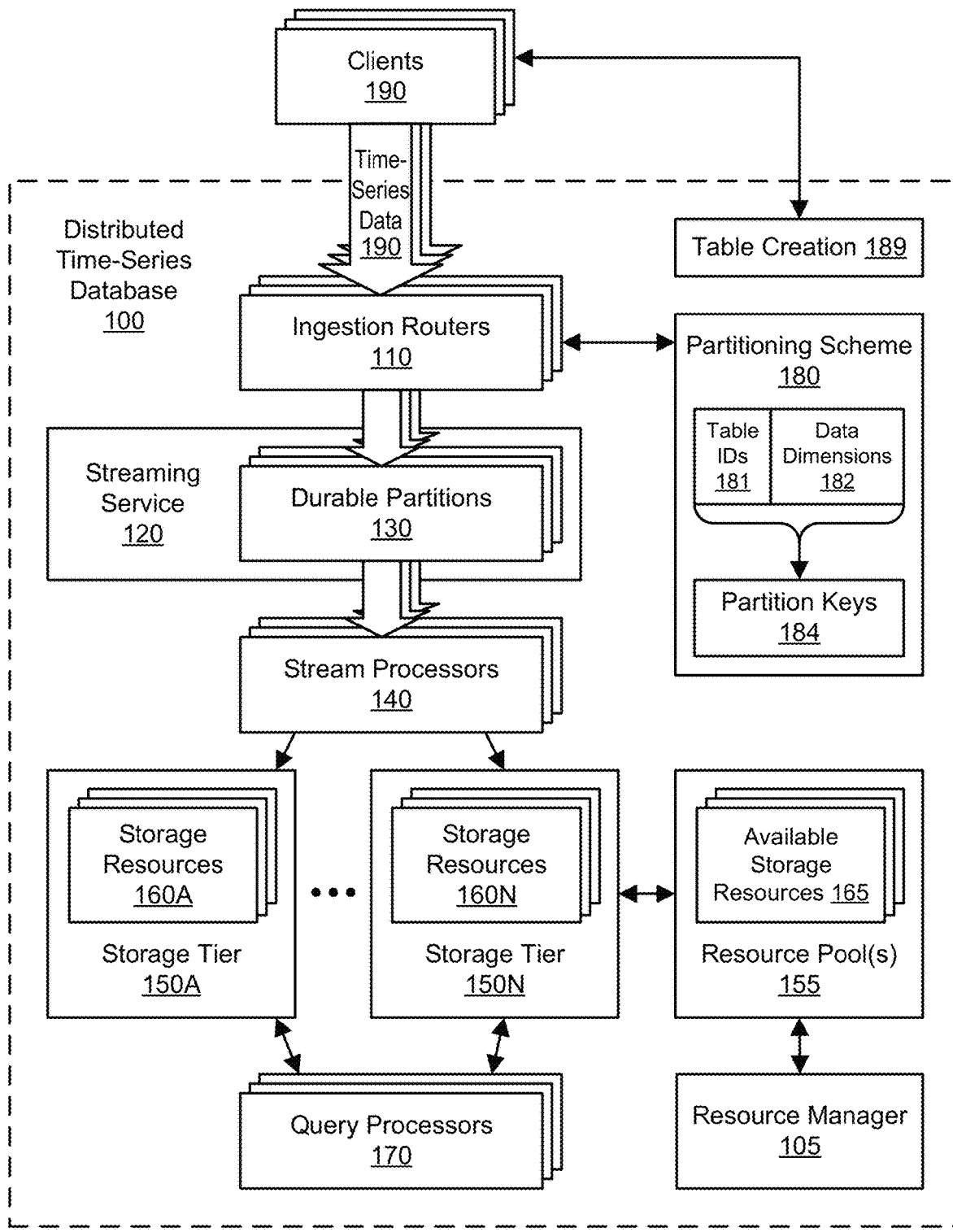
FIG. 1 illustrates an example system environment for multi-tenant partitioning in a time-series database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for multi-tenant partitioning in a time-series database are described. A time-series database may ingest one or more streams of time-series data and route the data to various partitions. Stream processors associated with the partitions may then store the partitioned time-series data in one or more storage tiers. The time-series data may belong to a plurality of tables, and different tables may be owned by different clients of the database. The database may include a set of storage resources that are distributed across various data centers, availability zones, or other logical or geographical locations. For example, the storage resources may offer low-latency access to a "hot tier" of data, such as the most recent data elements from the stream(s). In a hot storage tier, the time-series data may be partitioned into a set of tiles along non-overlapping temporal and spatial boundaries. For a particular tile having particular temporal and spatial boundaries, a stream processor may write time-series data to a group of replicas on particular storage nodes.

In prior approaches, storage resources were provisioned on a table-by-table basis, and partitions held only a single tenant (client). When a new table was created, the database acquired and configured storage resources for the new table before data belonging to the table could be ingested. Such per-table storage management could cause delays in data processing and thus degrade the user experience. Additionally, single-tenant partitions could lead to inefficient use of storage resources, e.g., if resources were allocated and maintained for tables that were underutilized or never utilized. Furthermore, per-table storage management created an additional burden for maintaining per-table metadata.

Using the techniques described herein, storage resources may be provisioned prior to table creation, and partitions may hold multiple tenants (clients). A table identifier may be associated with or part of an ingested data point, and the data point may be routed to an appropriate partition based (at least in part) on the table identifier using a partitioning scheme. A single partitioning scheme may be used for routing data from multiple tables and/or multiple clients to a set of partitions. A given partition may hold data from multiple tables and/or multiple clients. Using techniques for multi-tenant partitioning, time-series data for new tables may be ingested without waiting for storage resources to be partitioned. Additionally, storage resources may be used more efficiently by clustering small and/or little-used tables into the same partitions. Furthermore, the per-table metadata overhead may be reduced.

As one skilled in the art will appreciate in light of this disclosure, embodiments may be capable of achieving certain technical advantages, including some or all of the following: (1) reducing storage requirements for data points in a distributed database by clustering tables in multi-tenant partitions; (2) improving the speed of data ingestion for new tables by provisioning storage resources before table creation and not after table creation; (3) reducing storage requirements for metadata by eliminating some per-table metadata; (4) reducing the use of computational resources by scaling a control plane to the rate of ingestion across all tables and not requiring table-by-table overhead; and so on.

FIG. 1 illustrates an example system environment for multi-tenant partitioning in a time-series database, according to some embodiments. A distributed time-series database 100 may ingest and store time-series data 191 and make the stored data available for queries. Elements of the time-series data 191 may be received by the database 100 from clients 190 over time, e.g., as one or more streams of time-series data. Clients 190 may represent various types of client devices that generate or otherwise provide data in various time series to the database 100. Clients 190 may have client accounts with the database 100, and the accounts may permit the clients to request database operations such as table creation 189 and data ingestion. Using the multi-tenant partitioning described herein, table creation 189 may be a very fast operation in which the database 100 creates a table identifier for a new table and stores metadata associated with the new table but does not need to provision storage resources specific to the table. Table creation 189 may include sending a new table identifier to the appropriate client in response to receiving a request to create the new table from the client. After the table creation 189 is performed, data points for the new table may be ingested by the database 100 and stored using storage resources 160A-160N that were provisioned before the table creation. Ingested data points may include or reference the table identifiers for the tables to which the data points belong.

A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. However, the scaling may be performed based (at least in part) on a metric such as the ingestion rate across the entire set of tables and not on a per-table basis.

The ingested time-series data 191 may represent a large number of individual time series. An individual time series may include a sequence of values or observations (e.g., for a feature of a system or a phenomenon) that can be plotted over time. An individual time series may be uniquely identified by a set of dimensions such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. Similarly, time series within the same table and/or belonging to the same client may be clustered. The database 100 may offer a query language that provides filtering according to dimensions such as the device model, instance type, region, address, location, and so on. In one embodiment, any change to such a dimension may produce a new time series in the database 100.

In one embodiment, the database 100 may use a single partitioning scheme 180 that maps ingested data points to different partitions 130. An ingested data point may include or reference a table identifier to which the data point belongs, and the partitioning scheme may use the table identifier to identify the particular partition to which the data point should be routed. The partitioning scheme 180 may use hashing techniques. For example, the partitioning scheme 180 may include a multi-level hash tree or multi-dimensional hash structure that maps hashes of data points to partition keys 183 of partitions 130. In one embodiment, one level (e.g., the first level) of the multi-level hash tree may represent table identifiers 181. For example, the table identifier may be included as a prefix to a data point, and the hash tree may operate upon the prefix to generate a hash. In one embodiment, one level of the multi-level hash tree may represent client account identifiers. In one embodiment, one or more additional levels of the multi-level hash tree may represent dimensions 182 of the data points. The partitioning scheme 180 may map data points to partition keys 183 that identify the partitions 130. In one embodiment, the partitioning scheme may be determined once, such that the scheme maps all potential table identifiers (as contributors to the entire hash space) to a set of partitions 130.

The database 100 may manage a large amount of time-series data throughout the lifecycle of the data. The time-series data 191 may be received at the database 100 using a fleet of ingestion routers 110. The time-series data may typically arrive at the database 100 in time order, but the database may be able to ingest out-of-order data as well. Using the partitioning scheme 180, the ingestion routers 110 may divide the data 191 from the clients 190 into non-overlapping partitions 130. In one embodiment, the ingested data may be spatially partitioned along non-overlapping spatial boundaries according to the table identifier, the client account identifier, time series or range of the data, one or more tags associated with the data, the region that produced the data, the category to which the data belongs, dimensions of the data, and/or other suitable metadata. As will be discussed in greater detail below, ingested time-series data may be mapped to different partitions based on hierarchical clustering in order to achieve better performance of data storage and retrieval. A partition may include one time series or multiple time series.

The partitions 130 may be maintained using persistent storage resources and may be termed durable partitions. In various embodiments, the durable partitions 130 may be provided by a streaming service 120 or by a durable data store. The streaming service 120 may use shards or other divisions to implement the non-overlapping partitions 130. The streaming service 120 or a control plane may dynamically increase or decrease the number of partitions based (at least in part) on the amount or rate of ingestion of time-series data across all tables and/or all clients. Similarly, the control plane may dynamically increase or decrease the number of ingestion routers 110 based (at least in part) on the amount or rate of ingestion of time-series data across all tables and/or all clients. The resources of the control plane itself may be scaled based (at least in part) on the amount or rate of ingestion of time-series data across all tables and/or all clients and not necessarily per table or per client. The use of the durable partitions 130 as a staging area may permit the database 100 to decouple ingestion from stream processing and storage. Acknowledgements of requests to add time-series data elements may be sent to the clients 190 upon the successful addition of time-series data elements to the partitions 130.

A fleet of stream processors 140 may take the time-series data from the durable partitions 140, potentially process the data in various ways, and add the data to one or more storage tiers 150A-150N. For example, one stream processor may write data from one partition to a "hot" storage tier, and another stream processor may write data from the same partition to a "cold" storage tier. As another example, a stream processor may create materialized views or derived tables based on a partition, such as an aggregation or rollup of a time interval. In various embodiments, stream processors may perform reordering, deduplication, aggregation of different time periods, and other transformations on time series data. The data 191 may be routed from the durable partitions 130 to the stream processors 140 according to routing metadata, e.g., that maps different time series or ranges of the data to different stream processors. In one embodiment, a given stream processor may be assigned to one and only one partition at a time. In one embodiment, as the number of partitions increases or decreases based on the amount or rate of ingestion across all tables and/or all clients, the number of stream processors may also tend to increase or decrease dynamically.

In one embodiment, the stream processors 140 may organize the time series in tables. The stream processors 140 may also be referred to as writers or table builders. A table may store one or more time series. A table may be a named entity that stores related time series that are usable by the same application. A table may be associated with a particular client. A data point in a time series may be stored in a record. Data points may be added to the database 100 using application programming interface (API) calls or other programmatic interfaces. In one embodiment, data points for multiple time series (e.g., for related time series generated by the same client device) with the same timestamp may be added by a client using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may often have numeric values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, dimensions may be indexed for use in queries, and queries may specify time intervals and/or dimensions rather than individual measures. Data points may also include or be associated with table identifiers and/or client identifiers usable in hierarchical clustering.

The various storage tiers 150A-150N may represent different use cases for time-series data. The storage tiers 150A-150N may differ in their performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. As another example, the database 100 may include a cold tier that offers higher latency (but a lower cost) by storing a longer interval of time-series data using persistent storage resources such as disk drives. The database 100 may include other tiers such as a warm tier that stores recent time-series data in nonvolatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane that permits users (e.g., developers of applications) and other systems to perform management and modeling of time series data. For example, the control plane may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, clients may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors 170, queries of time-series data may be performed for particular time intervals. The database 100 may enable specialized mathematical functions such as interpolation, approximation, and smoothing to be performed on time-series data, e.g., in order to find trends and patterns. By contrast, traditional relational database management systems may require developers to write complex application code in order to perform such functions. By interacting with the query processors 170, various applications may use the database 100 to perform analysis of time-series data. For example, machine learning and machine vision applications may use time-series data managed by the database 100.

In one embodiment, one or more components of the distributed database 100, such as compute instances and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, durable partitions 130, stream processors 140, storage resources 160A-160N, and/or query processors 170. The provider network may include numerous data centers hosting various resource pools, such as collections of physical and/or virtualized computer servers, storage devices, networking equipment and the like, that are used to implement and distribute the infrastructure and services offered by the provider.

As shown in the example of FIG. 1, the provider network may offer one or more resource pools 155 that offer available storage resources 165. The storage resources 165 may include, for example, storage nodes that can be selected, provisioned, and configured to provide computational and storage for the hot tier 150A. A resource manager 105 associated with the provider network may permit the database 100 to select and provision any of the available storage resources 165 and return unnecessary storage resources to the pool(s) 155. As used herein, provisioning a storage node or other storage resource may generally include reserving all or part of an underlying physical compute instance having sufficient storage or memory resources (e.g., from a pool 155 of available physical compute instances and other resources), installing or launching required software (e.g., an operating system and database-specific software), and making the compute instance and its storage and memory available to the database 100 for performing tasks such as storing and querying time-series data.

Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. Partitions stored using the storage resources 160A-160N may also be deemed to have multi-tenancy when a given partition stores time-series data from multiple clients. In one embodiment, portions of the functionality of the provider network, such as the distributed database 100, may be offered to clients in exchange for fees.

In one or more of the storage tiers such as tier 150A, the time-series data may be partitioned into a set of tiles along non-overlapping temporal and spatial boundaries. A tile may thus represent a partition of time-series data within a time range (between a starting time and an ending time) and within a range of keys. The storage resources 160A for such a tier 150A may also include a set of storage nodes that are distributed across various data centers, availability zones, or other logical or geographical locations. A tile may be replicated across the storage nodes with a group of replicas (e.g., three replicas) that are eventually consistent without using a consensus mechanism. The storage resources 160A may represent volatile memory resources (e.g., RAM) and/or nonvolatile memory resources (e.g., solid-state drives).

Figure 7:
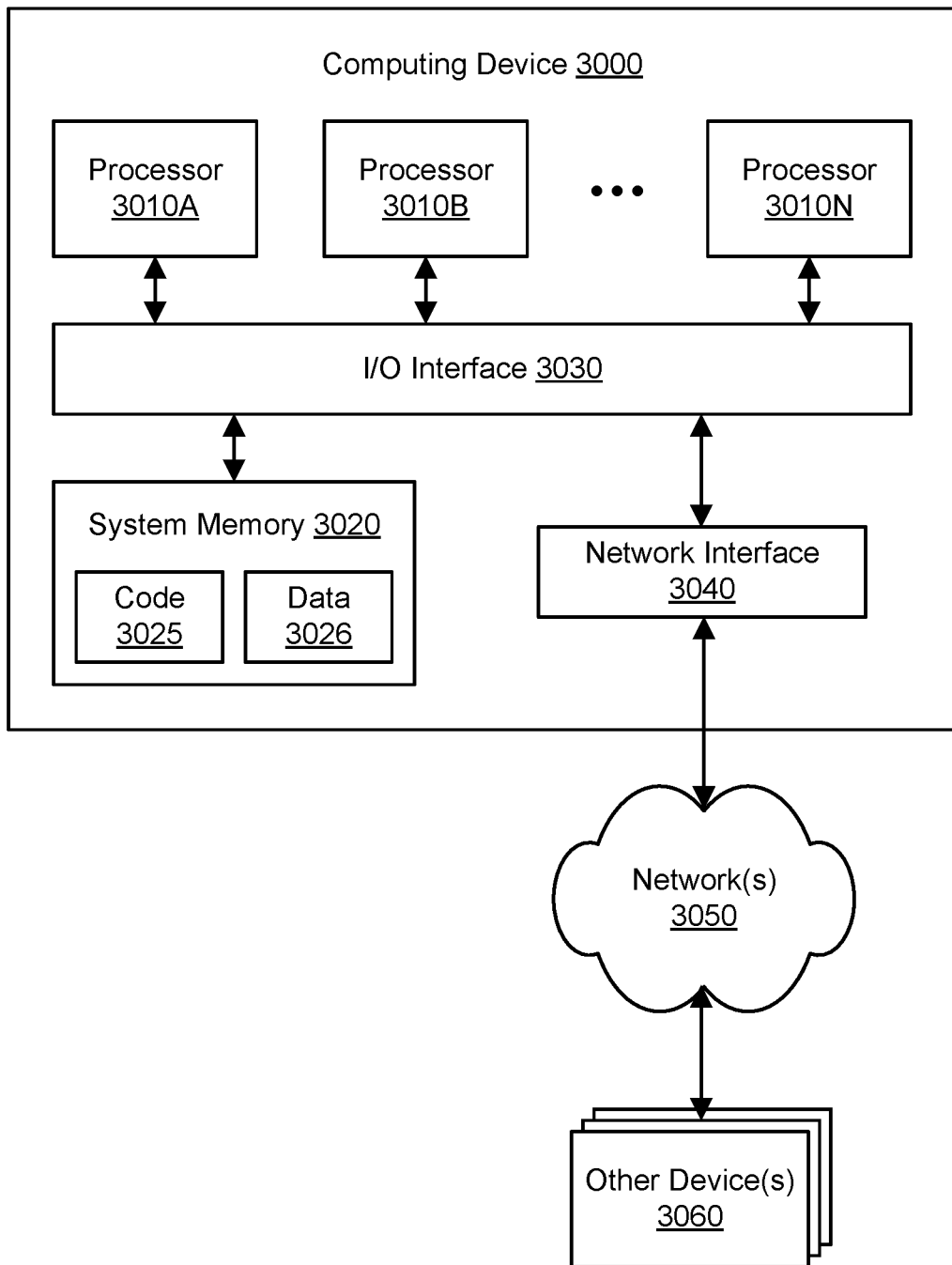
FIG. 7 illustrates an example computing device that may be used in some embodiments.

In various embodiments, components of the distributed database 100, such as the ingestion routers 110, streaming service 120, stream processors 140, storage tiers 150A-150N, query processors 170, and/or control plane may be implemented using any suitable number and configuration of computing devices, any of which may be implemented by the example computing device 3000 illustrated in FIG. 7. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. In one embodiment, the client devices may be implemented using any suitable number and configuration of computing devices, any of which may be implemented by the example computing device 3000 illustrated in FIG. 7. Clients 190 may convey network-based service requests to the ingestion router fleet 110 via one or more networks, e.g., to supply a stream of data for processing using the stream processors 140 and storage in the storage tiers 150A-150N. The network(s) may encompass any suitable combination of networking hardware and protocols necessary to establish network-based communications between client devices 190 and the distributed database 100. For example, the network (s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
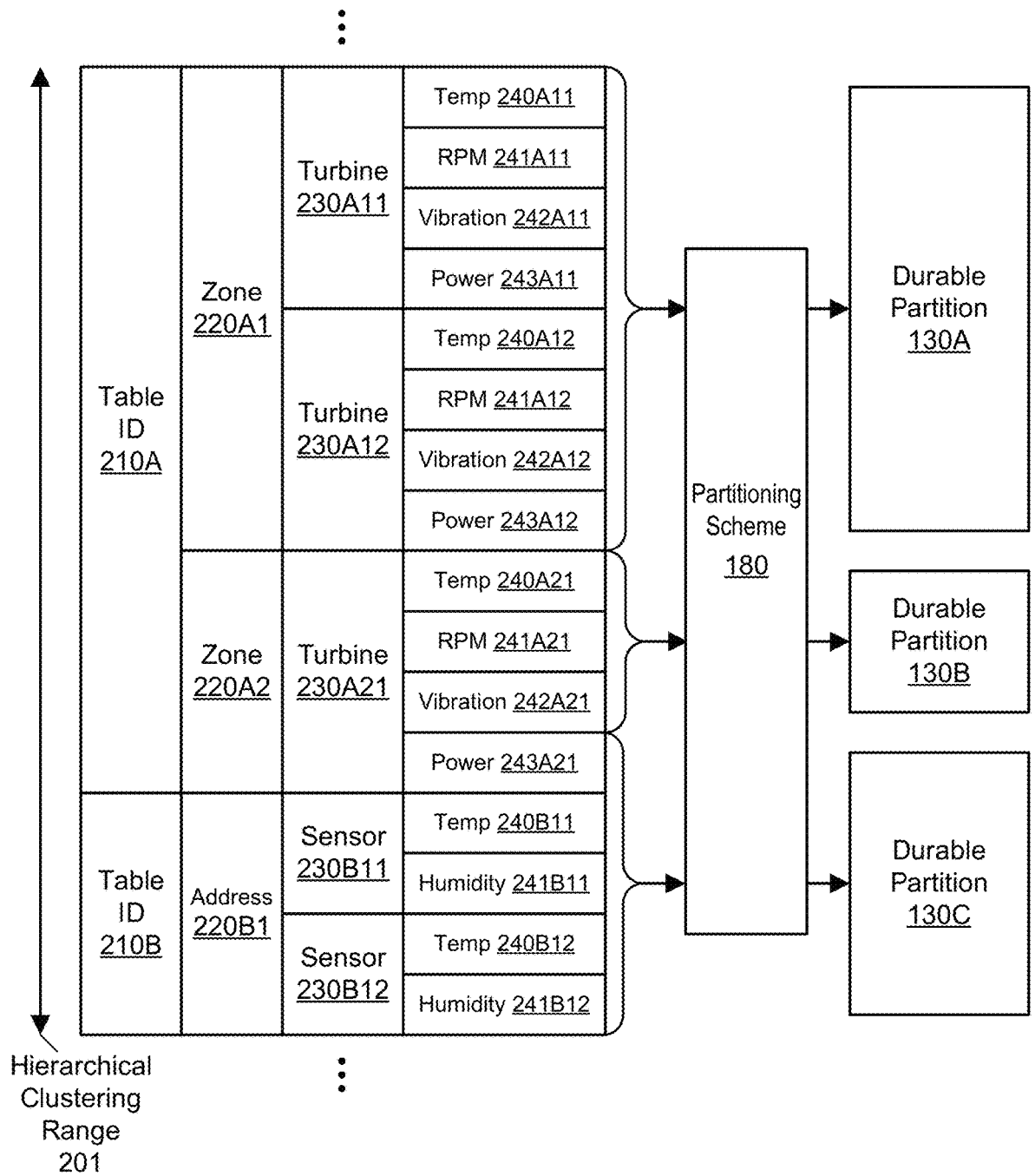
FIG. 2 illustrates further aspects of the example system environment for multi-tenant partitioning in a time-series database, including an example of mapping time-series data across multiple tables to partitions using a single partitioning scheme, according to some embodiments.

FIG. 2 illustrates further aspects of the example system environment for multi-tenant partitioning in a time-series database, including an example of mapping time-series data across multiple tables to partitions using a single partitioning scheme, according to some embodiments. Using the partitioning scheme 180, the ingestion routers 110 may organize time-series data along a hierarchical clustering range 201. Some time series may be related to other time series via a hierarchy. Using hierarchical clustering, related time series may be placed near each other throughout their lifecycle in the time-series database 100. Similarly, time series within the same table or time series from related tables (such as tables owned by the same client) may be placed near each other throughout their lifecycle in the time-series database 100. The use of hierarchical clustering may achieve a higher degree of compression for time-series data as well as lower latency for queries. The hierarchy may be specified by clients 190 or may be inferred automatically using contextual information, such as the geographical proximity of different time series, the generation of different time series by the same client device, and so on. The ingestion routers 110 may tag incoming data points so that hierarchically related series are co-located properly. A hash-based clustering scheme 180 may be used at various stages of the database 100 to enforce the hierarchical clustering. Using the partitioning scheme 180, individual time series may be mapped to various partitions.

As shown in the example of FIG. 2, an example of a hierarchical relationship path for client devices representing wind-turbine sensors may be Country, State, City, Zone, Wind Turbine, and Metric. For a particular table identifier 210A, a portion of data having this hierarchical scheme may include data for two zones 220A1 and 220A2 and two turbines per zone 230A11, 230A12, 230A21, and 230A22. Turbine 230A11 may report measurements for temperature 240A11, RPM 241A11, vibration 242A11, and power 243A11. Turbine 230A12 may report measurements for temperature 240A12, RPM 241A12, vibration 242A12, and power 243A12. Turbine 230A21 may report measurements for temperature 240A21, RPM 241A21, vibration 242A21, and power 243A21. A hash-based clustering scheme supporting this hierarchy may co-locate all measurements for a given wind turbine, all wind turbines for a given zone, and so on. In one embodiment, all metrics of all wind turbines in a zone/city/state may be clustered together. In one embodiment, the hierarchical clustering may be changed over time and in response to query workloads in order to reduce the latency of queries. For example, the example data of FIG. 2 may be reorganized (for future data points) with temp, RPM, vibration, and power as higher-level constructs than the turbine identifiers.

The hierarchical clustering range 201 may also include time series belonging to another table identifier 210B. Table 210B may include data for one address 220B1 and two sensors 230B11 and 230B12 at that address. Sensor 230B11 may report measurements for temperature 240B 11 and humidity 241B 11, while sensor 230B21 may report measurements for temperature 240B12 and humidity 241B 12. In the example of FIG. 2, a single partition 130C may store time series from multiple tables 210A and 210B. The partition 130C may thus represent a multi-tenant partition.

The data points for the hierarchy shown in FIG. 2 may be mapped to various durable partitions by the ingestion routers 110. As shown in the example, the time-series data may be mapped and routed to partitions 130A, 130B, and 130C. In one embodiment, different numbers of time series may be mapped to different partitions based (at least in part) on the ingestion rate of those time series. Partitions may be split or merged as appropriate to adapt to changing ingestion rates. Each durable partition may support streaming. A particular partition may be mapped to a particular stream processor, e.g., for writing data from the partition to a particular storage tier. In one embodiment, partitions 130A-130C may represent shards of a streaming service 120. In one embodiment, partitions 130A-130C may represent database tables or other durable storage resources.

Figure 3:
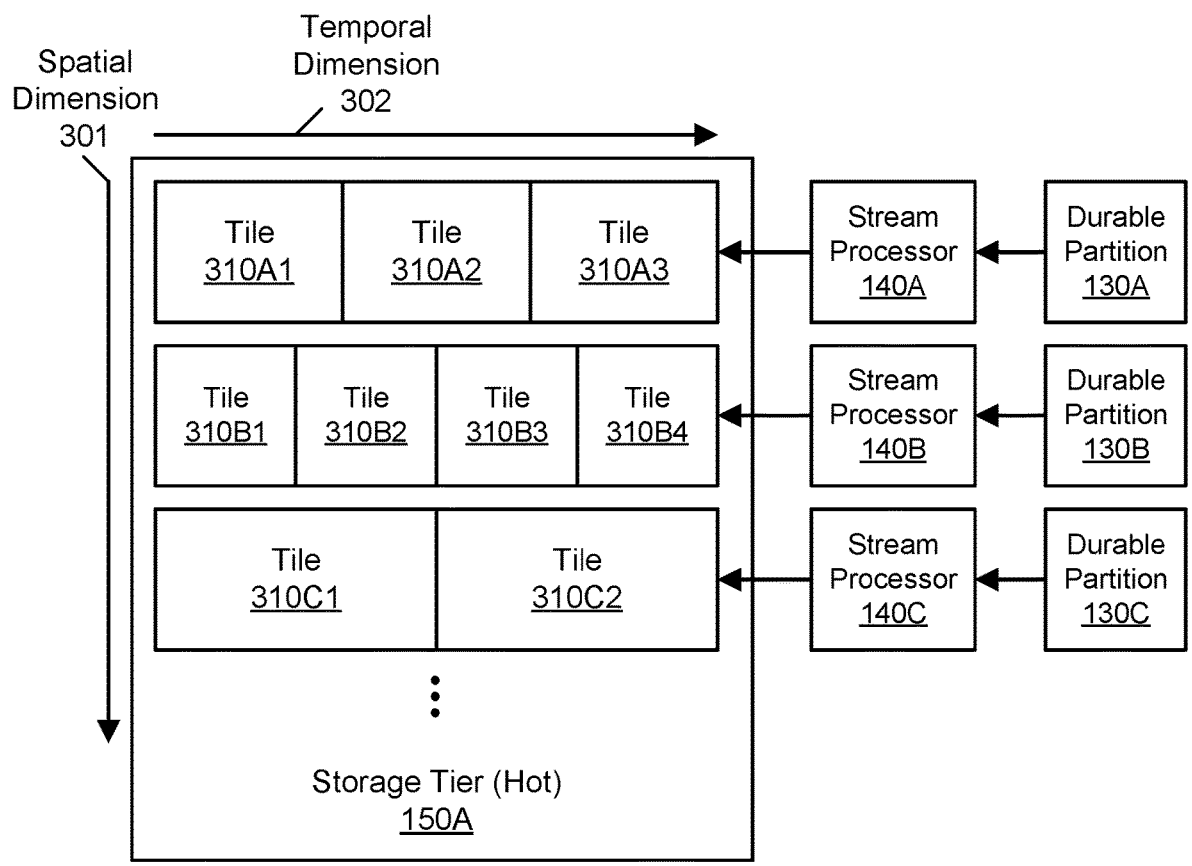
FIG. 3 illustrates further aspects of the example system environment for multi-tenant partitioning in a time-series database, including storage of time-series data using two-dimensional tiles in a hot tier, according to some embodiments.

FIG. 3 illustrates further aspects of the example system environment for multi-tenant partitioning in a time-series database, including storage of time-series data using two-dimensional tiles in a hot tier, according to some embodiments. As discussed above, the database 100 may include a hot storage tier such as tier 150A that stores recent data with high availability and low latency. In one embodiment, the hot tier 150A may include a set of storage hosts or storage nodes that include computational resources and memory resources. The storage nodes may store time-series data using tiles that are generated or appended to by stream processors. Tiles may be stored using storage resources such as memory (e.g., RAM) and/or solid-state drives for lower latency of storage and retrieval. Tiles may be replicated across different nodes (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on hierarchical clustering that seeks to co-locate related measurements and/or time series in the same partition, and the hierarchical clustering may be performed by the ingestion routers 110. Tiles may also be partitioned along non-overlapping temporal boundaries. Due to the spatial dimension 301 and the temporal dimension 302, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ.

In the example of FIG. 3, a set of time series may be mapped to durable partitions 130A, 130B, and 130C based on a spatial range (e.g., hierarchical clustering). Particular partitions may be mapped to particular stream processors for writing data from the partitions to the hot tier 150A. For example, partition 130A may be assigned to stream processor 140A that writes to the hot tier, partition 130B may be assigned to stream processor 140B that writes to the hot tier, and partition 130C may be assigned to stream processor 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the stream processor for a partition may write to an open tile. Out-of-order data may be routed to previously closed tiles in some circumstances. As shown in the example of FIG. 3, stream processor 140A may write to an open tile 310A3 that was preceded in time by a now-closed tile 310A2 that was preceded in time by a now-closed tile 310A. Similarly, stream processor 140B may write to an open tile 310B4 that was preceded in time by a now-closed tile 310B3 that was preceded in time by a now-closed tile 310B2 that was preceded in time by a now-closed tile 310B1. Additionally, stream processor 140C may write to an open tile 310C2 that was preceded in time by a now-closed tile 310C1. As discussed above, the contents of a tile may be replicated (e.g., using three replicas) across different location or zones to achieve greater durability of the hot tier.

Figure 4:
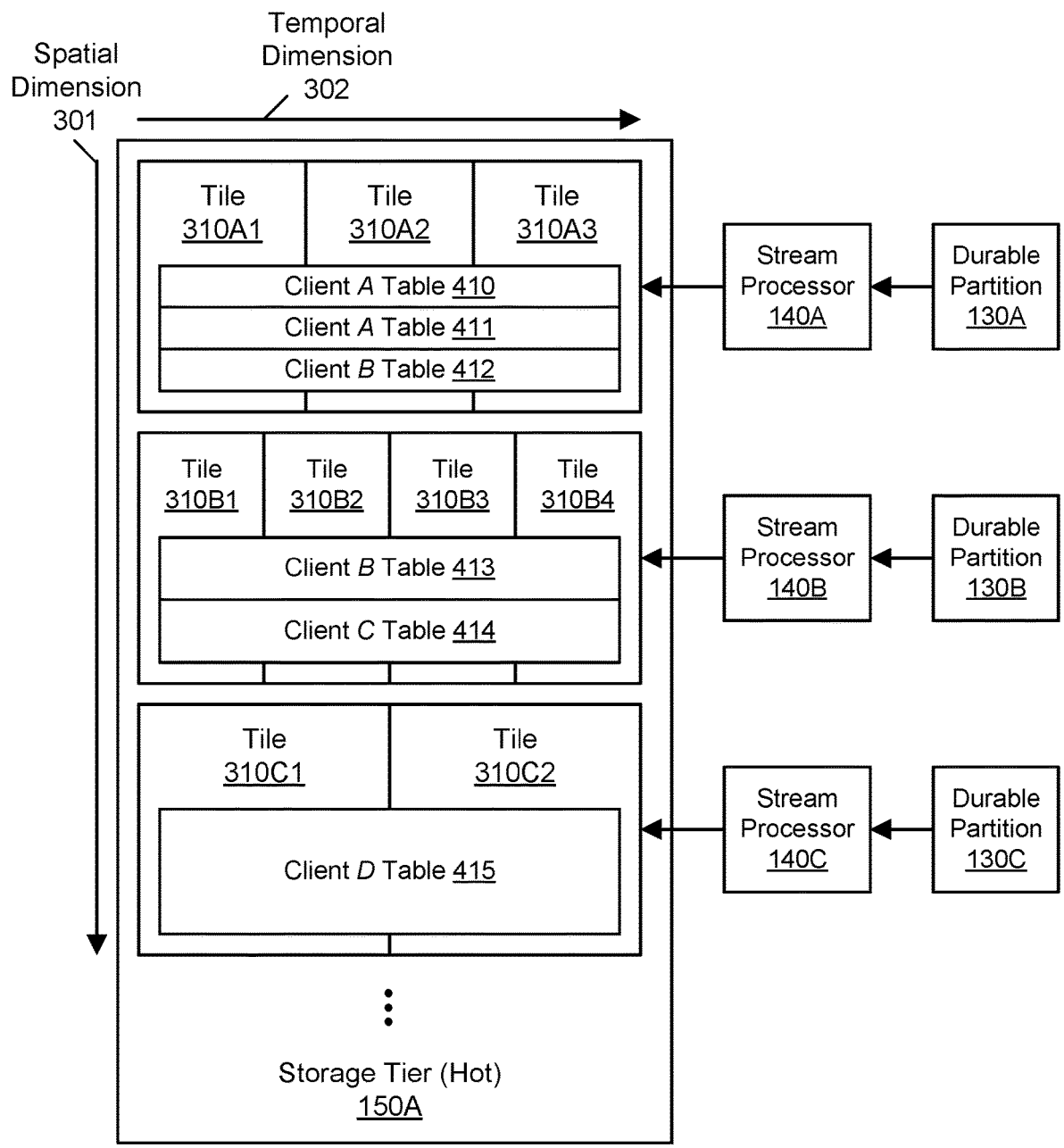
FIG. 4 illustrates further aspects of the example system environment for multi-tenant partitioning in a time-series database, including multi-tenant storage of time-series data using two-dimensional tiles in a hot tier, according to some embodiments.

FIG. 4 illustrates further aspects of the example system environment for multi-tenant partitioning in a time-series database, including multi-tenant storage of time-series data using two-dimensional tiles in a hot tier, according to some embodiments. Using the same partitioning scheme 180 for a plurality of tables, the database 100 may map different tables to the same set of tiles. As shown in the example of FIG. 4, partition 130A may include tables 410, 411, and 412. Tables 410 and 411 may belong to (e.g., be managed by the database on behalf of) client A, while table 412 may belong to (e.g., be managed by the database on behalf of) a different client B. Similarly, partition 130B may include tables 413 and 414. Table 413 may belong to (e.g., be managed by the database on behalf of) client B, while table 414 may belong to (e.g., be managed by the database on behalf of) yet another client C. Partition 130C may include a single table 415 owned by a particular client D. The clustering of various tables into the various partitions may be based (at least in part) on the ingestion rate and/or size of the tables. For example, tables 410, 411, and 412 may be relatively small or have low ingestion rates and may thus be clustered together into partition 130A in order to achieve storage efficiency. As another example, table 415 may be particularly large and/or may have a high ingestion rate and may thus be isolated in its own partition 130C.

Within a tile, time-series data belonging to a particular table or client may be stored using a continuous storage segment that is isolated and distinct from other continuous storage segments representing other tables or clients. A node-local mapping layer may be used to achieve multi-tenant interfaces at the tile level. Data points may be expired when their temporal boundaries are beyond the retention period (e.g., three hours) for the tier and table. In one embodiment, a continuous storage segment representing a particular table within a tile may be expired independently of other storage segments within the same tile. Expiration may include either deleting the storage segment or marking it for deletion. In one embodiment, the entire tile may be expired when all of its storage segments are expired. In one embodiment, continuous storage segments may be encrypted using client-specific encryption keys. Using client-specific keys, data from different tables may be securely stored in tiles such that access to one table (or data from one client) does not necessarily permit access to another table (or data from another client) within the same tile.

Figure 5:
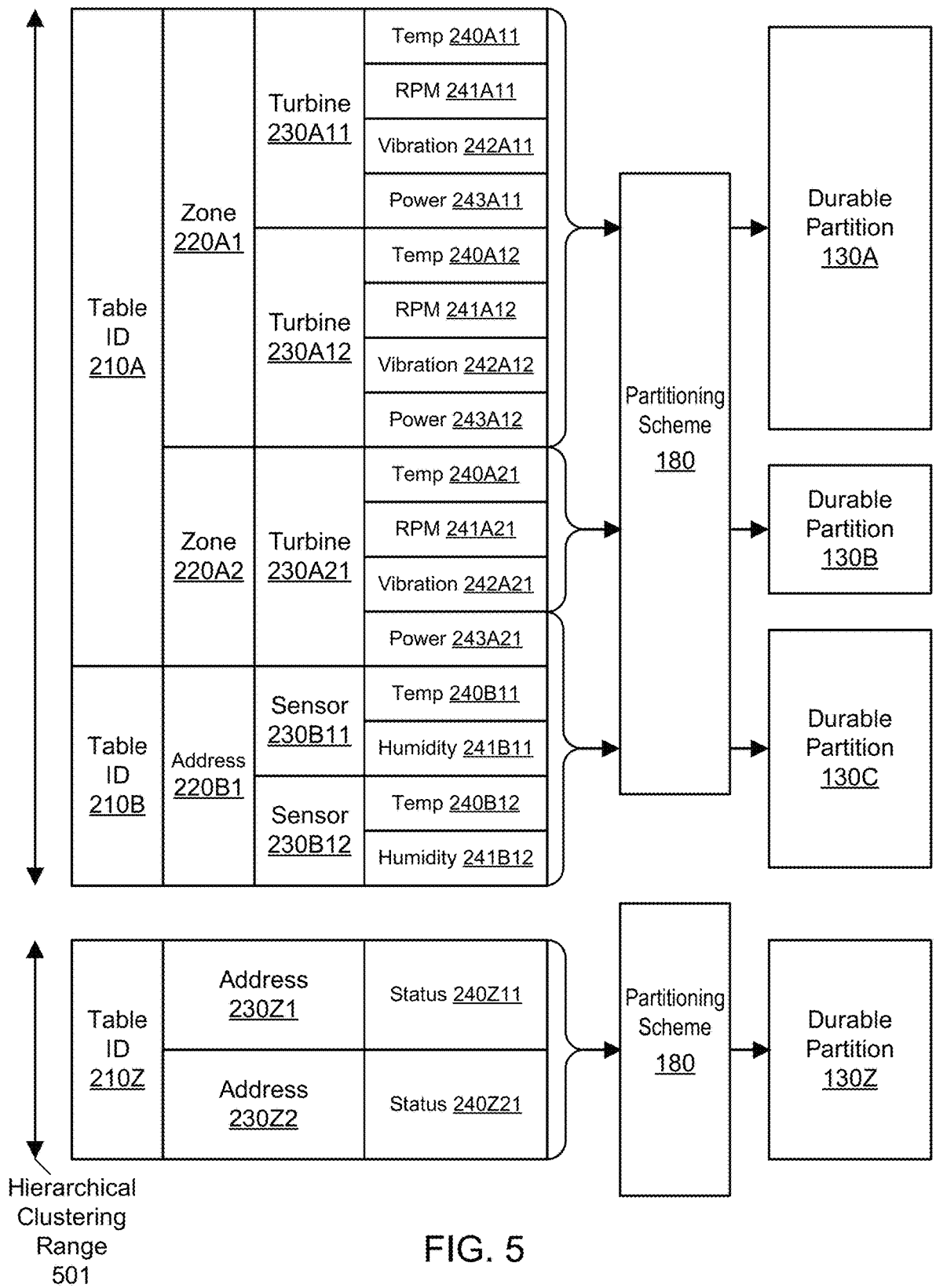
FIG. 5 illustrates further aspects of the example system environment for multi-tenant partitioning in a time-series database, including an example of mapping time-series data across multiple tables to partitions using different partitioning schemes, according to some embodiments.

FIG. 5 illustrates further aspects of the example system environment for multi-tenant partitioning in a time-series database, including an example of mapping time-series data across multiple tables to partitions using different partitioning schemes, according to some embodiments. In one embodiment, one or more other partitioning schemes may be used in addition to the partitioning scheme 180 described above. A different partitioning scheme 580 may also map data points from one or more tables to one or more partitions as discussed above, e.g., using a multi-level hash tree that operates based (at least in part) on table identifiers, data dimensions, and so on. However, the partitioning scheme 580 may be independent of the original partitioning scheme 180. For example, the partitioning scheme 580 may be created for a particular client that provides data at a high ingestion rate. As another example, the partitioning scheme 580 may be created for a particular client that requests the highest possible level of security and data isolation. As yet another example, the partitioning scheme 580 may be created for a test environment in which one or more clients may test the ingestion and processing of data from one or more tables.

An additional hierarchical clustering range 501 may also include time series belonging to a table identifier 210Z. Table 210Z may include data for one address 230Z1 and a status 240Z11 at that address along with another address 230Z2 and a status 240Z21 at that address. In the example of FIG. 5, this table 210Z may be mapped to a single partition 130Z using the different partitioning scheme 580. In one embodiment, the table ID 210Z may be used to select the partitioning scheme 580 over the partitioning scheme 180. In one embodiment, other metadata associated with the client or the table may be used to select the partitioning scheme 580 over the partitioning scheme 180.

Figure 6:
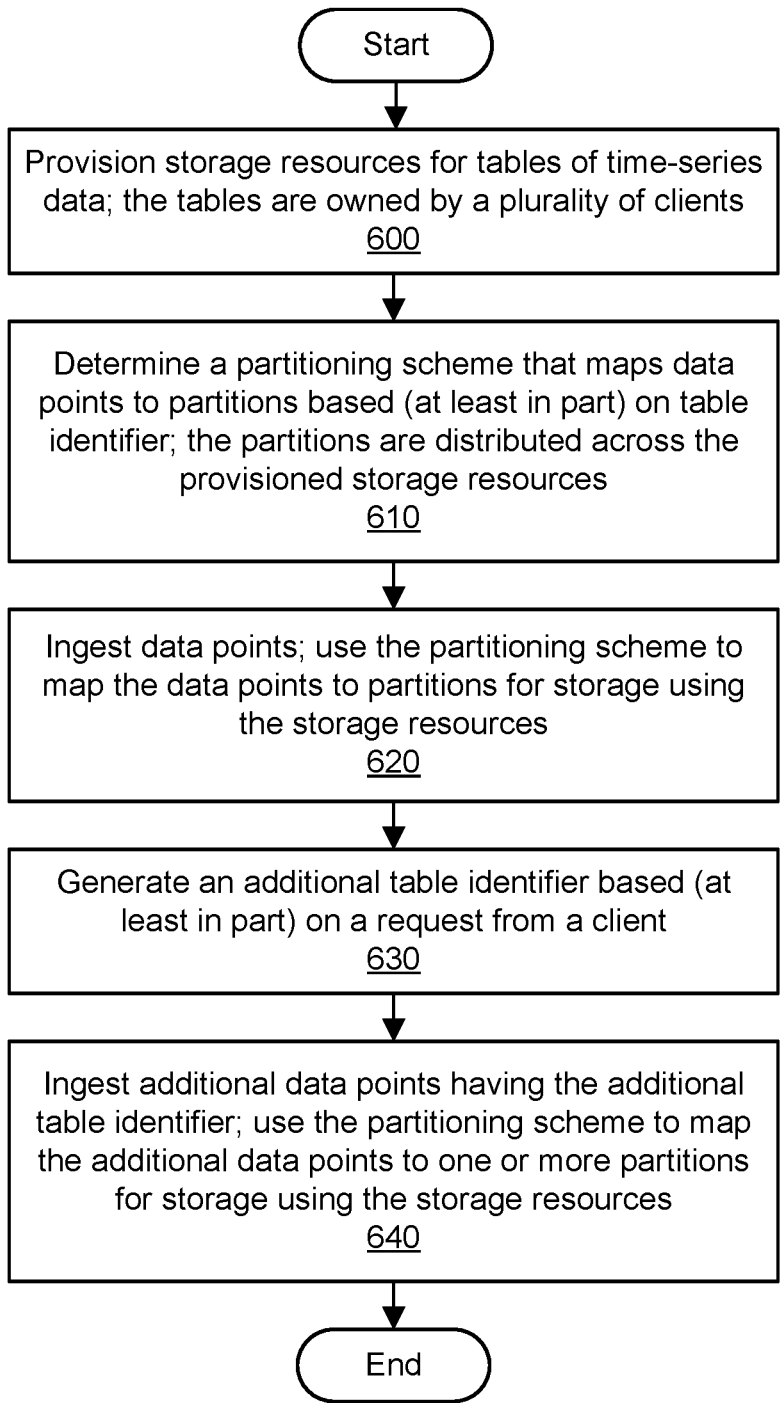
FIG. 6 is a flowchart illustrating a method for multi-tenant partitioning in a time-series database, according to some embodiments.

FIG. 6 is a flowchart illustrating a method for multi-tenant partitioning in a time-series database, according to some embodiments. As shown in 600, storage resources may be provisioned for a plurality of tables of time-series data. The tables may be owned or managed on behalf of a plurality of clients. The storage resources may include storage nodes with computational and memory resources, e.g., in a hot tier that stores recent time-series data with low latency and high availability. The storage resources may be provisioned from one or more resource pools of a multi-tenant provider network. In one embodiment, the amount of the storage resources (e.g., the number of storage nodes and/or their collective storage capacity) may be determined using resource forecasting. In one embodiment, the amount of the storage resources may change over time, e.g., based (at least in part) on an ingestion rate of time-series data across a plurality of tables and/or clients. Additional storage resources may be provisioned from the resource pool(s) as needed, and unneeded storage resources may be deprovisioned and returned to the storage pool(s).

As shown in 610, a partitioning scheme may be determined for a plurality of tables and/or clients. The partitioning scheme may map data points of time-series data to various partitions. The partitions may be distributed across the storage resources that were previously provisioned. An ingested data point may include or reference a table identifier to which the data point belongs, and the partitioning scheme may use the table identifier to identify the particular partition to which the data point should be routed. The partitioning scheme may use hashing techniques. For example, the partitioning scheme may include a multi-level or multi-dimensional hash tree. In one embodiment, one level (e.g., the first level) of the multi-level hash tree may represent table identifiers. For example, the table identifier may be included as a prefix to a data point, and the hash tree may operate upon the prefix. In one embodiment, one level of the multi-level hash tree may represent client account identifiers. In one embodiment, one or more additional levels of the multi-level hash tree may represent dimensions of the data points. The partitioning scheme may map data points to partition keys that identify the partitions. In one embodiment, the partitioning scheme may be determined once, such that the scheme maps all potential table identifiers to a set of partitions.

As shown in 620, data points may be ingested by the database. The ingestion process may use the partitioning scheme to map the data points to various partitions for eventual storage using the provisioned storage resources. In one embodiment, an ingested data point may include or reference a table identifier to which the data point belongs, and the partitioning scheme may use the table identifier to identify the particular partition to which the data point should be routed. In one embodiment, the partitioning scheme may also use one or more dimensions of an ingested data point to identify the particular partition to which the data point should be routed. After being routed to the appropriate partitions, the ingested data points may be written by one or more stream processors to appropriate storage resources in one or more storage tiers. In one embodiment, the data points (already partitioned on a spatial dimension) may be further partitioned along a temporal dimension when written to the storage tier(s), such that "tiles" in a hot storage tier may be deemed two-dimensional. By using a single partitioning scheme as described above, a single tile may store data points from multiple tables and/or multiple clients.

As shown in 630, an additional table may be created. The additional table may be created based (at least in part) on a request from a particular client to create the table. Table creation may include generation of a table identifier for the additional table. The additional table identifier may be returned to the client and potentially used by the client when providing data points for the new table. In one embodiment, table creation need not require the database to provision storage resources specific to the table. The previously provisioned storage resources may instead be used for storage of data points of the new table. Thus, in one embodiment, ingestion of data points for the new table may begin without a delay associated with storage provisioning.

As shown in 640, additional data points having the additional table identifier may be ingested by the database. The ingestion process may use the partitioning scheme to map the additional data points to one or more existing partitions for eventual storage using the previously provisioned storage resources. In one embodiment, the additional data points may include or reference the additional table identifier to which the data points belongs, and the partitioning scheme may use the additional table identifier to identify the particular partition to which the data point should be routed. In one embodiment, the partitioning scheme may also use one or more dimensions of an additional data point to identify the particular partition to which the data point should be routed. After being routed to the appropriate partitions, the additional data points may be written by one or more stream processors to appropriate storage resources in one or more storage tiers. In one embodiment, the additional data points (already partitioned on a spatial dimension) may be further partitioned along a temporal dimension when written to the storage tier(s), such that "tiles" in a hot storage tier may be deemed two-dimensional. By using a single partitioning scheme as described above, a single tile may store data points from multiple tables and/or multiple clients. New tables and/or clients may be added easily to an existing storage environment using the single partitioning scheme.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a distributed time-series database comprising one or more processors and one or more memories to store computer-executable instructions that, when executed, cause the one or more processors to:
provision a plurality of storage resources configured to store a plurality of tables representing time-series data, wherein data points of the time-series data comprise client identifiers associated with a plurality of clients, and wherein the plurality of clients is associated with the plurality of tables;
determine a partitioning scheme having a temporal dimension and a spatial dimension that maps the data points to a plurality of partitions based at least in part on the client identifiers, wherein the partitions are stored using the storage resources;
generate an additional client identifier based at least in part on a request to create an additional table, wherein the request to create the additional table is received after the storage resources are provisioned;
ingest one or more additional data points comprising the additional client identifier;
based at least in part on the partitioning scheme, map the one or more additional data points to a particular pre-existing partition of the plurality of partitions; and
store the one or more additional data points in the particular pre-existing partition using the storage resources.

2. The system as recited in claim 1, wherein the particular pre-existing partition stores a first table belonging to a first client and the additional table belonging to an additional client.

3. The system as recited in claim 1, wherein the partitioning scheme comprises a multi-level hash tree usable for hierarchical clustering, wherein a first level of the multi-level hash tree represents the client identifiers, and wherein an additional level of the multi-level hash tree represents one or more dimensions of the data points.

4. The system as recited in claim 1, wherein the plurality of storage resources is provisioned from one or more resource pools of a multi-tenant provider network, and wherein an amount of the plurality of storage resources is increased or decreased based at least in part on an ingestion rate across the plurality of clients.

5. A method, comprising:
determining a partitioning scheme having a temporal dimension and a spatial dimension that maps a plurality of data points to a plurality of partitions based at least in part on client identifiers associated with the data points, wherein the partitions are stored using a plurality of storage resources;
generating an additional client identifier after the storage resources are provisioned;
based at least in part on the partitioning scheme, mapping one or more additional data points comprising the additional client identifier to a particular pre-existing partition of the plurality of partitions; and
storing the one or more additional data points in the particular pre-existing partition using the storage resources.

6. The method as recited in claim 5, wherein the client identifiers identify a plurality of tables belonging to a plurality of clients.

7. The method as recited in claim 6, wherein the additional client identifier indicates an additional table, wherein the particular pre-existing partition stores a first table belonging to a first client and the additional table belonging to an additional client.

8. The method as recited in claim 7, further comprising:
encrypting a continuous storage segment associated with the first table in the particular pre-existing partition according to a first customer key; and
encrypting a continuous storage segment associated with the additional table in the particular pre-existing partition according to a second customer key.

9. The method as recited in claim 7, further comprising:
expiring a continuous storage segment associated with the first table in the particular pre-existing partition according to a first retention policy; and
expiring a continuous storage segment associated with the additional table in the particular pre-existing partition according to a second retention policy.

10. The method as recited in claim 5, wherein the partitioning scheme comprises a multi-level hash tree usable for hierarchical clustering, wherein a first level of the multi-level hash tree represents the client identifiers, and wherein an additional level of the multi-level hash tree represents one or more dimensions of the data points.

11. The method as recited in claim 5, further comprising:
provisioning the plurality of storage resources from one or more resource pools of a multi-tenant provider network; and
increasing or decreasing an amount of the plurality of storage resources based at least in part on an ingestion rate across a plurality of tables.

12. The method as recited in claim 5, further comprising:
determining an additional partitioning scheme that maps an additional plurality of data points to an additional plurality of partitions based at least in part on additional client identifiers associated with the additional plurality of data points;
based at least in part on the additional partitioning scheme, mapping one or more of the additional plurality of data points to a particular additional partition of the additional plurality of partitions; and
storing the one or more of the additional plurality of data points in the particular additional partition.

13. The method as recited in claim 5, wherein the plurality of data points represents time-series data, and wherein the time-series data is stored using a plurality of tiles having respective spatial and temporal boundaries.

14. One or more non-transitory computer-readable storage media storing program instructions that, when executed on or across one or more processors, perform:
determining a partitioning scheme having a temporal dimension and a spatial dimension that maps a plurality of data points of time-series data to a plurality of partitions based at least in part on client identifiers associated with the data points, wherein the partitions are stored using a plurality of storage resources, and wherein the client identifiers are associated with a plurality of clients;
generating an additional client identifier based at least in part on a request to create an additional table, wherein the request is received after the storage resources are provisioned;
based at least in part on the partitioning scheme, mapping one or more additional data points comprising the additional client identifier to a particular pre-existing partition of the plurality of partitions; and
storing the one or more additional data points in the particular pre-existing partition using the storage resources.

15. The one or more non-transitory computer-readable storage media as recited in claim 14, wherein the particular pre-existing partition stores a first table belonging to a first client and the additional table belonging to an additional client.

16. The one or more non-transitory computer-readable storage media as recited in claim 15, further comprising additional program instructions that, when executed on or across the one or more processors, perform:
encrypting a continuous storage segment associated with the first table in the particular pre-existing partition according to a first customer key; and
encrypting a continuous storage segment associated with the additional table in the particular pre-existing partition according to a second customer key.

17. The one or more non-transitory computer-readable storage media as recited in claim 15, further comprising additional program instructions that, when executed on or across the one or more processors, perform:
expiring a continuous storage segment associated with the first table in the particular pre-existing partition according to a first retention policy; and
expiring a continuous storage segment associated with the additional table in the particular pre-existing partition according to a second retention policy.

18. The one or more non-transitory computer-readable storage media as recited in claim 14, wherein the partitioning scheme comprises a multi-level hash tree usable for hierarchical clustering, wherein a first level of the multi-level hash tree represents the client identifiers, and wherein an additional level of the multi-level hash tree represents one or more dimensions of the data points.

19. The one or more non-transitory computer-readable storage media as recited in claim 14, further comprising additional program instructions that, when executed on or across the one or more processors, perform:
provisioning the plurality of storage resources from one or more resource pools of a multi-tenant provider network; and
increasing or decreasing an amount of the plurality of storage resources based at least in part on an ingestion rate across a plurality of clients.

20. The one or more non-transitory computer-readable storage media as recited in claim 14, further comprising additional program instructions that, when executed on or across the one or more processors, perform:
- determining an additional partitioning scheme that maps an additional plurality of data points to an additional plurality of partitions based at least in part on additional client identifiers associated with the additional plurality of data points;
- based at least in part on the additional partitioning scheme, mapping one or more of the additional plurality of data points to a particular additional partition of the additional plurality of partitions; and
- storing the one or more of the additional plurality of data points in the particular additional partition.

* * * * *